O. F. ZAHN.
SELF-RIGHTING ROLLER BEARING.
APPLICATION FILED AUG. 18, 1908.
915,529.
Patented Mar. 16, 1909.
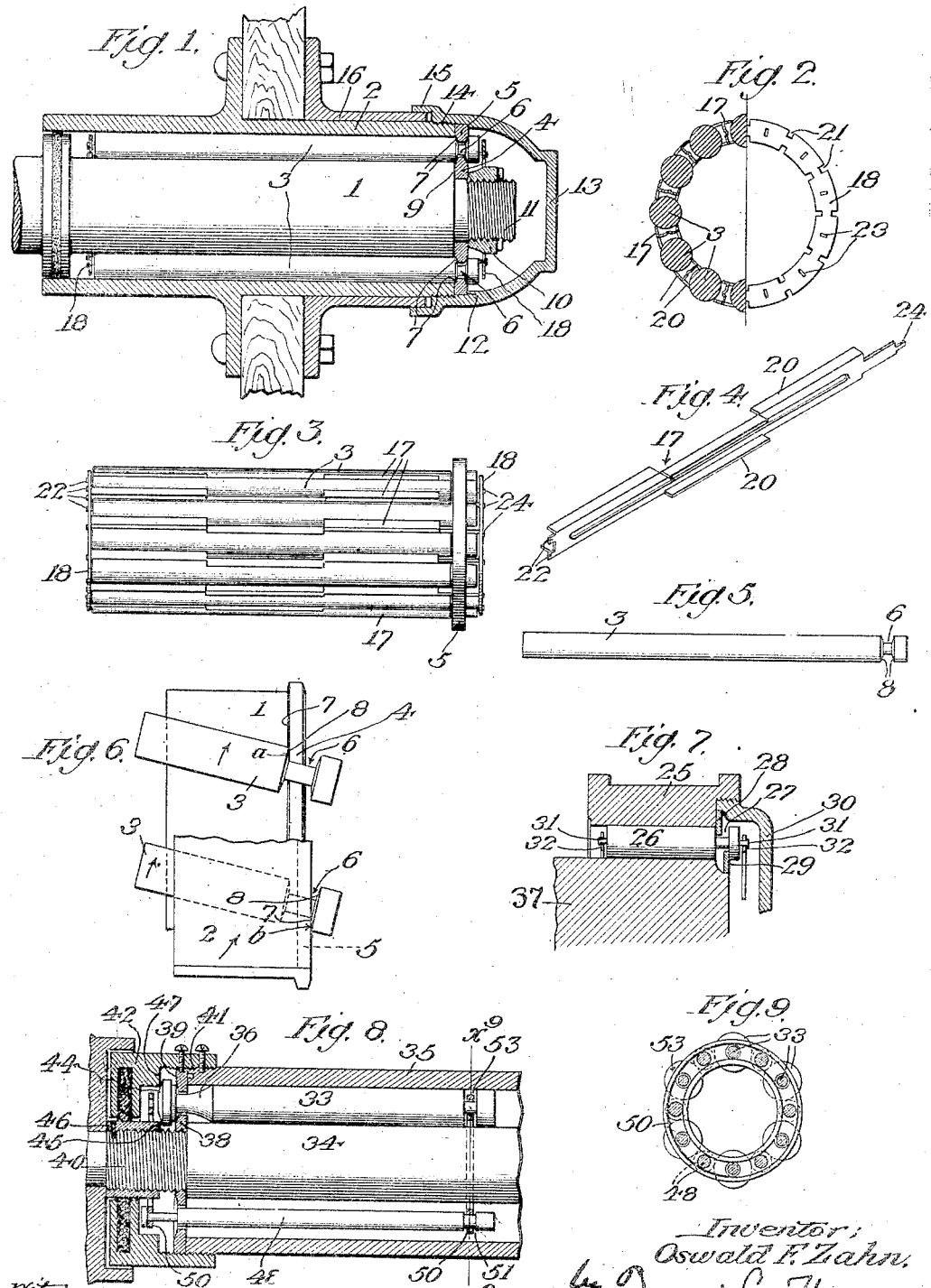
Witnesses:
Inventor:
Oswald F. Zahn,
His Attorneys

UNITED STATES PATENT OFFICE.

OSWALD F. ZAHN, OF LOS ANGELES, CALIFORNIA, ASSIGNOR TO ZAHN SELF RIGHTING ROLLER BEARING COMPANY, OF LOS ANGELES, CALIFORNIA, A CORPORATION OF CALIFORNIA.

SELF-RIGHTING ROLLER-BEARING.

No. 915,529.   Specification of Letters Patent.   Patented March 16, 1909.

Application filed August 18, 1908. Serial No. 449,155.

*To all whom it may concern:*

Be it known that I, OSWALD F. ZAHN, a citizen of the United States of America, residing at Los Angeles, in the county of Los Angeles and State of California, have invented a new and useful Self-Righting Roller-Bearing, of which the following is a specification.

From the past experiences of the roller bearing art, it has been found that the greatest imperfection in the bearings and especially where rollers take end thrusts and are very long, that they will be disalined or skewed. Heretofore cage means, spacing rollers, lock rollers, etc., have been resorted to with the view of overcoming this difficulty. These soon become worthless after being in use, for whereas such means can only stand a strain of a few pounds, the rollers, which they are intended to guide, may carry loads of several tons. I have not only discovered how to avoid the cause of this difficulty but in addition thereto have found that my particular construction has many other advantages.

One object of my invention is to provide a roller bearing wherein the same rollers that take the radial strain of the bearing also take the lateral strains or end thrusts of both bearing members.

A further object of the invention is to provide a roller bearing of this character wherein all the means for maintaining correct position of the rollers relatively to the bearing are provided at a single end of the rollers and bearing members.

Another object of the invention is to provide a bearing of this character wherein the rollers with their self-righting and end thrust devices can be removed bodily from and inserted bodily into the bearing as a self-contained unit.

Another object of the invention is to provide improved means for self-righting or maintaining alinement of the rollers in a bearing during severe and continual end thrust pressure.

Another object is to provide a roller bearing of this character in which it is possible to install a greater number of rollers than heretofore has been possible without resorting to mechanical expedients such as splitting the guide rings or the bearing members or cutting out notches in the members, or making the rollers or members into segments in order to allow of the insertion of a full set of rollers.

Another object is to construct such a bearing wherein the rollers will not wear the cages on a bias and wherein the rollers will still keep their alinement after long use when the cage or other spacing means becomes worn and wabbly.

Another object is to cheapen the cost of production.

Another object is to provide a bearing of this nature wherein no sleeve or bushing is required and if such are used the sleeve need not be removed when wheel and rollers are withdrawn from the axle of a vehicle.

Other objects of the invention will appear in and from the specification and claims.

Cross reference is made to my application Serial No. 332,294, filed in the United States Patent Office on August 27, 1906. Cross reference is also made to my applications copending herewith and filed respectively March 20, 1907, Serial No. 363,519; October 7, 1907, Serial No. 396,279; July 6, 1908, Serial No. 442,194; July 22, 1908, Serial No. 444,831. Subsequently to the filing of my said application Serial No. 332,294, I made application for certain foreign patents on the subject matter thereof, which applications were filed in the respective countries as follows: United Kingdom of Great Britain and Ireland, September 19, 1906, Serial No. 20,833, for which Letters Patent of said United Kingdom of Great Britain and Ireland, No. 20,833, of 1906, have been granted and issued; Empire of Germany, September 27, 1906, for which Letters Patent of said country No. 201,924, have been granted and issued; Republic of Mexico, October 20, 1906, for which Letters Patent No. 6,196, have been granted and issued; Belgium, September 22, 1906, for which Letters Patent No. 195,045 have been granted and issued; Republic of France, September 21, 1906, for which Patent No. 370, 821, has been issued; Commonwealth of Australia, May 23, 1907, for which Letters Patent No. 8,789 have been granted and issued; and Empire of Japan, July 16, 1907, for which Letters Patent No. 14,691, have been granted and issued.

The accompanying drawings illustrate the invention:

Figure 1 is a longitudinal section of the roller bearing as applied to a vehicle wheel. Fig. 2 is an end view partly in section of the self-contained set of rollers and retaining means therefor. Fig. 3 is a side elevation of the same. Fig. 4 is a perspective view of one of the combined spacing and retaining means. Fig. 5 is a side elevation of one of the bearing rollers. Fig. 6 is a diagrammatic development of portions of the outer and inner bearing members and the rollers running thereon, showing principle of rectification. Fig. 7 is a partial longitudinal section of the bearing embodying certain features of the invention. Fig. 8 is a longitudinal section of another bearing embodying certain features of the invention. Fig. 9 is a transverse section on the line $x^9$—$x^9$ of the bearing roller set of Fig. 8.

Referring to Figs. 1 to 5, the bearing comprises an inner bearing member 1 shown as a fixed axle member, and an outer bearing member 2 shown as a box or casing member of a wheel, it being understood that either the inner or outer member may be fixed or rotative, the bearing being generally applicable where there are two relatively movable bearing members. Between the inner and outer bearing members run the rollers 3 which are adapted to engage with the said bearing members, and are provided with spacing and retaining members holding the said rollers in a self-contained set and are further provided with means for taking end thrusts of both bearing members, and for maintaining correct position of the rollers in the bearing.

The end thrust means comprise inner and outer abutment rings or flanges 4 and 5, which have their opposite edges extending into an annular groove or reduced portion 6 in each roller at a single end thereof leaving the other end of the roller smooth; or, in other words, without an annular groove or reduced portion 6 for a similar purpose. This annular reduced portion being at or near the same end, for example, the outer end, in all of the rollers.

Rings 4 and 5 do not touch the bottom of the grooves 6 but their abutment faces 7 may be beveled so that lateral engagement, with the walls or shoulders 8 of the grooves, is prevented except at the peripheries of the rollers. Said walls of the grooves 6 may also be beveled at a steeper angle than the said faces 7. At the outer end of the axle or bearing the inner ring 4 is clamped between the shoulder 9 of the inner bearing 1 and a nut 10 screwing on the threaded outer end portion 11 of said inner bearing member. The outer end-thrust ring 5 is clamped between the outer end of the outer bearing member 2 and a shoulder 12 of the cap 13 which screws onto the threaded portion 14 of the outer bearing member. Thus the inner and outer rings 4 and 5 become parts of the bearing members 1 and 2 when the bearing is assembled and in operation. Said cap 13 may also have a flange 15 to engage with the hub member 16.

The spacing and retaining means may consist of a plurality of longitudinal members or strips 17 adapted to extend longitudinally between and alternately with the rollers and connected at their ends to rings 18, so as to form a cage which rotates with and retains and spaces the rollers. Each longitudinal member 17 has lateral flanges 20 adapted to engage with the bearing rollers 3 to retain said rollers.

The rings 18 have notches 21 in their inner and outer edges and also have holes 23. The notches 21 receive the tongues 22 at the inner end of the spacing members 17, and the holes 23 receive the tongues 24 at the outer end of the said members. These tongues 22 and 24 are bent over or inclined on the rings after insertion therethrough. The two rings 18 are shown as of identical construction, so that a single die serves for both rings.

To assemble, the ring 4 is held at a certain height above a given plane; the rollers are then assembled around this so that the ring enters their grooves 6 and so that the set of rollers are spread at the bottom. The set now appears as cone shaped with the ring 4 inside at the apex. Ring 5 is now placed over the top. The bottom ends are then drawn in to their normal position and the spacing means assembled. It is with this construction and method that a greater number of rollers may be assembled, without resorting to unmechanical expedients, than has heretofore been possible for this class of bearings.

The rollers 3 with the inner and outer end-thrust rings 4, 5, longitudinal spacing and retaining means 17, and their connecting rings 18, constitutes a self-contained set which can be removed bodily from the bearing by simply opening one end of the bearing and pulling this set out from between the inner and outer bearing members. This set, when so removed, is shown in Fig. 3. By this construction the rollers can be inspected or replaced with a minimum of trouble and no adjustment of extra or additional parts is required.

The single pair of rings 4 and 5 serves to take all end thrusts or lateral pressure in both directions by contacting in the walls of the roller grooves 6. The contact being at the rolling diameter of the rollers 3, as shown, the end thrust friction is reduced to a minimum. There are at least two ways in which these same abutment rings 4 and 5 preserve alinement of the rollers which may be explained with reference to Fig. 6. If we assume that the outer bearing member 2 is moving in the direction of the arrow and the inner bearing member 1 is stationary, and that the abutment flanges 4 and 5 are rigid with the respective bearing members, and that one or more of the rollers deflects, for example, to the right so as to lie at an angle to the axis of the bearing as shown in said figure, then as the roller 3 rolls on the inner bearing member 1, it will drift toward the right so that the inner shoulder 8 of the groove 6 will engage with the inner face 7 of the abutment flange 4, for example, at point $a$, as indicated for the upper roller. At the same time, the outer bearing member 2, traveling over the roller, will drift toward the right, as indicated in the case of the lower roller, and the outer face of the outer end thrust abutment 5 will engage the outer wall 8 of the groove 6 in the roller, for example, at point $b$. The endwise pressure of the abutment flanges 4 and 5 thus produces a longitudinal spreading action, pulling the rollers as it were, into a position in which they will present maximum extension in the line of this action, thus bringing them into alinement with the bearing.

The frictional engagement of the roller, at $a$, with the stationary abutment flange tends to retard this end of the roller, but the frictional engagement of the moving abutment flange 5, with the roller, at $b$, tends to advance the same end of the roller, thus the retarding and advancing tendencies being at one end of the rollers, one counteracts the other during severe end thrusts, however the advancing effect slightly preponderates and especially so when the rollers are not in alinement, on account of the greater leverage of the point of application, with respect to the roller as a whole, so that the result is to advance the retarded end, and to set the roller right in the bearing. This effect co-operates with the direct spreading action above described.

When the rollers are in alinement they cannot be disalined by severe end thrusts for reason of the endwise spreading effect being at a single end of the rollers as above described, so that the rollers do not depend on the cage for preserving the alinement, and any looseness or wear of the cage will not interfere with the operation, and a very light and flexible cage and extremely long rollers can be utilized without danger of the bearing becoming deranged.

Fig. 7, shows an application of the invention where inner bearing member 37 rotates and outer bearing member 25 is stationary. In this form of the invention the rollers 26 have a groove 27 near one end and which engages the outer ring 28 and an inner ring 29 which may be of spring material. The outer ring 28 is clamped between the cap piece 30 and the outer bearing member 25, and the inner ring 29 is received on the inner bearing member 37. Retaining rings, 32, which may also serve as spacers, are connected to opposite ends of the rollers, each roller having a pin 31 at each end which passes through and is journaled on the ring at that end. The groove 27 is shown as provided with considerable clearance and the rings 28 and 29 are off-set so that ring 28 engages only with the inner wall of the groove and ring 29 engages only with the outer wall. The bearing is thus adapted to take end-thrusts in only one direction, it being understood that similar or equivalent means may be elsewhere provided for taking end thrusts in the opposite direction, for example, at the other end of the bearing member 37.

Figs. 8 and 9 illustrate another form of the invention wherein the rollers form a self-contained set, but the end-thrust devices are partly separate. The rollers 33 run between the inner bearing member 34 and the outer bearing member 35, and are provided with grooves 36 near one end, only one wall, namely the outer wall, of these grooves being used for engagement with the inner and outer end-thrust rings 38 and 39. The inner end-thrust ring 38 is secured on a screw threaded portion 40 of the inner bearing member, and the outer ring 39 is screwed within internal screw threaded portion 41 of the end member 42 screwing on the outer bearing member 35. Each roller 33 has also an enlarged outer end face 44 adapted to engage with end shoulders 45 on the sleeve 46 screwing on a portion 40 of the inner bearing member, and with a shoulder 47 on the end member 42 of the outer bearing member. In this form of the invention spacing rollers 48 are provided alternating with the other rollers, and retained by floating rings 50 which run in annular grooves 51 in the spacing rollers but which do not take any end thrust of either bearing member. The rings 50 at one end are beyond the rollers 33, and at the other end extend in grooves 53 of these same rollers. In this embodiment of the invention the spacing rollers 48 are used in place of a cage and form a non-rigid self-contained set of rollers which can be removed bodily from the bearing, as a unit, as previously referred to.

It is thus seen that I provide a construction of a roller bearing in which the rollers are provided with shoulder means at but one end and which are assembled together so that these means are at one end of the bearing; and that the inner and outer abutment rings or flanges, which in effect form continuations or abutments on the inner and outer bearing members respectively, are located at the same end and not only guide the rollers into absolute alinement, but also take the end thrusts of the bearing members.

Fig. 7 and the matter relating thereto has been embodied in this application by transfer from my application Serial Number 396,279, filed October 7, 1907, and Fig. 8 has been transferred from my application Serial Number 332,294, filed August 27, 1906.

Having thus described my invention the following is what I claim as new therein and desire to secure by Letters Patent:

1. A set of rollers, for a roller bearing, means at a single end of the rollers for taking end thrust of said bearing in both directions and holding the set of rollers in operative position for application to and withdrawal from one end of the bearing, the other end of the rollers being smooth.

2. The combination of a set of rollers for a roller bearing, each roller having an annular groove near one end the other end of the roller being smooth, and an inner abutment ring, and an outer abutment ring having their opposite edges entering the grooves of said rollers.

3. The combination of a set of rollers for a roller bearing, each roller having an annular groove near one end the other end of the roller being smooth, and an inner abutment ring, and an outer abutment ring, located in the same plane and having their opposite edges entering the grooves of said rollers.

4. The combination of a set of rollers for a roller bearing each roller having an annular groove near one end the other end of the roller being smooth, an inner abutment ring and an outer abutment ring located in the same plane and having their opposite edges entering the grooves of said rollers, and spacing and retaining means and connecting rings.

5. A cylindrically arranged series of cylindrical rollers, and means for holding them in a self-contained set: said rollers being provided with annular grooves, said annular grooves being located beyond the middle and near one end of said rollers the other end of the rollers being smooth, and inner and outer abutment rings entering said grooves at a single end of said set.

6. A roller bearing comprising inner and outer bearing members and rollers located between said bearing members, self righting and thrust bearing means at a single end of said rollers and bearing members whereby said means guide said rollers and take all end thrusts of said rollers and bearing members at the same single end of said bearing members.

7. A roller bearing comprising inner and outer bearing members, and rollers located between said bearing members and having annular grooves at one end the other ends of the rollers being smooth and abutment rings at the grooved end of said rollers which are adapted to self right the said rollers by entering said annular grooves of said rollers.

8. A roller bearing comprising inner and outer bearing members, rollers located between said bearing members and having annular grooves located at one end beyond the outer end of the bearing members the other ends of the rollers being smooth, an inner abutment ring, a nut securing the inner abutment ring to the inner bearing member, an outer abutment ring, and a cap securing the outer abutment ring to the outer bearing member.

9. A roller bearing having inner and outer bearing members and rollers located between said bearing members, said rollers and said bearing members having interengaging abutments and shoulders, all at a single end of said rollers and bearing members; whereby all end thrusts of said rollers and bearing members are taken up at a single end of said bearing members.

10. A roller bearing comprising inner and outer bearing members and rollers located between said bearing members; each of said rollers having an annular groove near a single end so as to form a shoulder the opposite end of the rollers being smooth, the bearing members having abutments adapted to laterally engage with said shoulders to take the end thrust of a bearing member.

11. A roller bearing comprising inner and outer cylindrical bearing members and cylindrical rollers located between said bearing members; each of said rollers having an annular groove, said grooves being located beyond the middle of said rollers and near an end thereof the opposite ends of the rollers being smooth, said bearing members each having an abutment ring at one end of said bearing members, said rings being adapted to take end thrusts of both of said bearing members by entering said grooves; and spacing means for said rollers.

In testimony whereof, I have hereunto set my hand at Los Angeles, California, this 10th day of August 1908.

OSWALD F. ZAHN.

In presence of—
FREDERICK S. LYON,
ARTHUR P. KNIGHT.